Patented Nov. 19, 1940

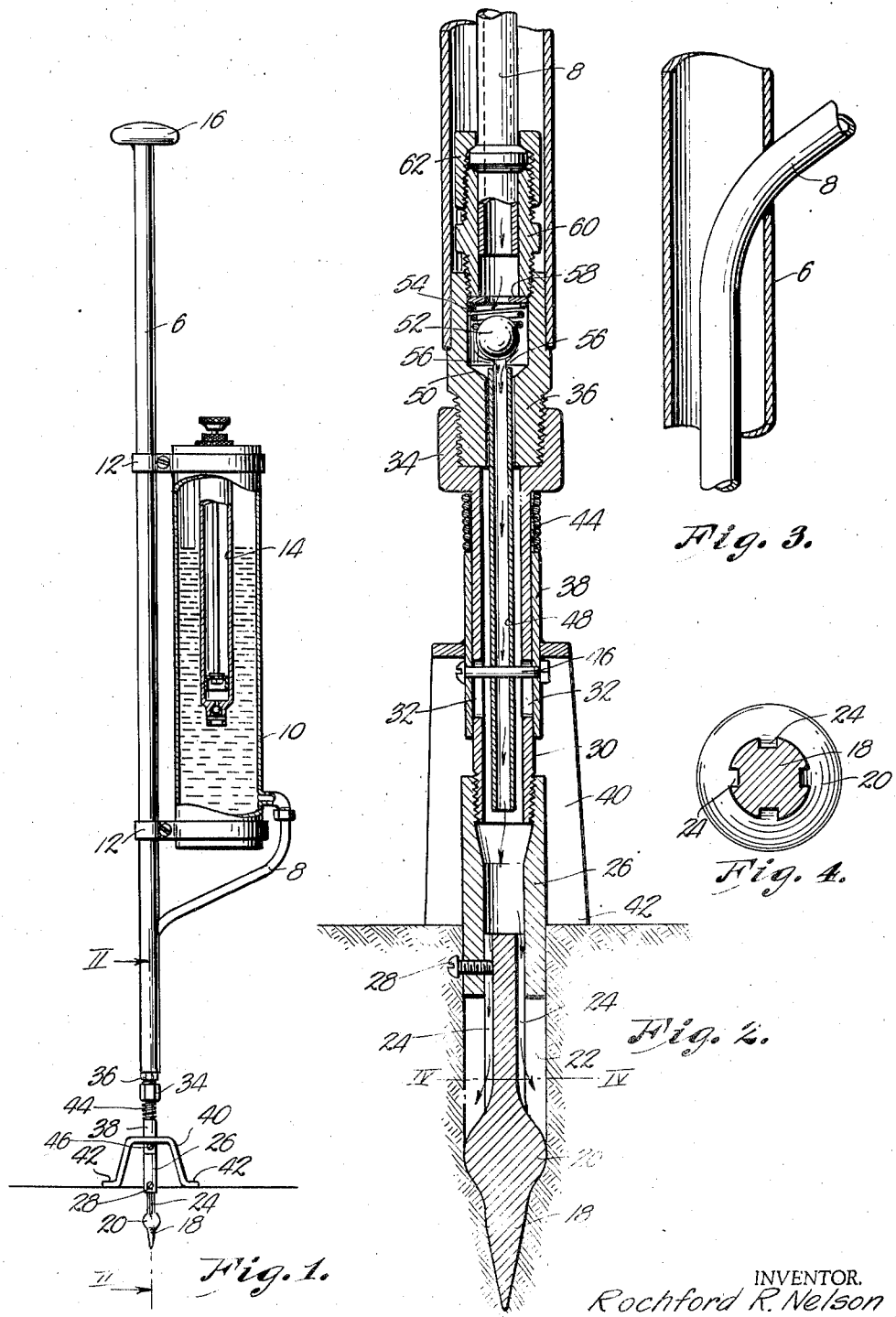

2,222,235

UNITED STATES PATENT OFFICE 2,222,235

APPLICATOR

Rochford R. Nelson, Kansas City, Mo.

Application February 26, 1940, Serial No. 320,749

4 Claims. (Cl. 47—49)

This invention relates to garden tools of the character designed to apply liquids to plants either at the root or in some portion of the stalk, for the purpose of supplying a liquid fertilizer or to apply a chemical that will destroy the plant in the event the tool is being employed for eradication of undesirable growths.

One of the important aims of this invention is the provision of an applicator for liquid, the needle of which is specially designed to automatically release a charge of material in liquid form, after the said needle has penetrated a substance a predetermined distance.

This invention has for another object the provision on an applicator of the aforementioned character wherein is included an assembly of unique elements, all tending to render the construction of the device simple and inexpensive.

The more specific objects of this invention include the provision of novel valve releasing means and unique needle form, the definite natures of which will appear during the course of the following specification, referring to the accompanying drawing wherein:

Fig. 1 is a side elevational view of an applicator made in accordance with this invention.

Fig. 2 is an enlarged longitudinal fragmentary sectional view through a portion of the applicator showing the needle thereof in the operative position to release liquid, taken on line II—II of Fig. 1.

Fig. 3 is a fragmentary detailed sectional view through a part of the staff of the applicator; and Fig. 4 is a transverse sectional view taken on line IV—IV of Fig. 2.

Recent developments in the art of producing liquid fertilizers and life-giving elements for plants have necessitated accurate applicators that will effectively impregnate a portion of the earth around the roots of a plant without wasting the liquid. Such applicators should not only include means for applying the liquid without waste, but means for governing the charge of liquid and parts for automatically releasing a charge of predetermined volume when the needle of the applicator has reached a position where it is buried in the earth and has formed a cavity therein that will quickly receive the volume of liquid forming the charge—for example, a product now on the market called Vitamin B-1 is a highly concentrated drug designed to be diluted and thereafter applied to the roots of plants.

It has been found in actual use that an applicator made to embody the invention, as it is illustrated herewith, will effectively introduce this vitamin where it will serve the most good and reach the plant roots without being wasted.

The illustrated embodiment of the applicator comprises a staff 6, the lower portion of which is hollow to receive a conduit 8 that is in communication with a pressure reservoir 10 supported on staff 6 through the medium of clamps 12.

This reservoir 10 is equipped with a conventional pump 14 which when operated, will maintain an air pressure within the reservoir to forcibly direct the liquid through conduit 8. Reservoir 10 may have the liquid placed thereinto by merely removing pump 14 and pouring the liquid through the hole wherein this pump normally rests.

Staff 6 has a knob 16 on the upper end thereof which is normally grasped by the operator while the needle 18 of the applicator is being forced into the earth. This needle may be of the conventional straight type when applying an eradicating fluid to the stalk and leaves of plants, but in the instance illustrated, is formed to have a bulbous portion 20 intermediate its ends so as to form a cavity 22 in the earth as it penetrates the same.

Bulbous portion 20 is of a diameter greater than the diameter of the needle adjacent to its innermost end and a series of grooves 24 provided in the face of needle 18 presents outlet ports for the liquid in a manner that will hereinafter be more fully set down.

Needle 18 is removably held in a hollow chuck 26 by a set screw or similar element 28. This chuck 26 is screw-threadedly fastened to a pipe section 30 wherein is formed a pair of diametrically opposed slots 32 and whereupon is created an internally screw-threaded head 34 adapted to engage one end of a fitting 36.

A sleeve 38 slidably circumscribes pipe section 30 and covers slots 32. This sleeve has a yoke 40 rigid therewith, the legs of which extend outwardly and downwardly to present surface engaging feet 42, as seen in Fig. 1.

A spring 44 positioned between the upper end of sleeve 38 and the lower side of head 34 normally maintains sleeve and yoke 38 and 40 respectively at one end of their path of travel.

A cross pin 46 passes through slots 32 and is secured to sleeve 38 so that as the latter reciprocates, it will move a longitudinal member in the form of a tube 48 back and forth within pipe section 30. Pin 46 is secured to tube 48 and in the instance shown, the liquid passes through this tube en route to the outlet ports 24 of needle 18.

Valve fitting 36 has a valve seat 50 and a valve member in the nature of a ball 52 which normally closes the longitudinal passage through fitting 36, but which opens said passage when yoke 40 is depressed. A spring 54 exerting force upon ball 52 causes this said ball to follow the upper end of tube 48 and yieldably maintains the ball on seat 50. The upper end of tube 48 adjacent to ball 52 has a number of notches 56 formed through the wall thereof so that when the ball is engaged by tube 48, the former will not close the end of the tube.

A control plate 58 having an aperture of predetermined size, is disposed within fitting 36 and the operator may wish to alter the flow of liquid by changing the control plate from time-to-time.

A coupling 60 interconnects the end of conduit 8 and fitting 36 and said conduit 8 may be secured to coupling 60 through the medium of a conventional nut 62. Thus, it is observed that a passage is provided from pressure reservoir 10 directly to the outlet ports 24 of needle 18.

When the applicator is operated, needle 18 is forced into the earth to form a cavity 22. When the needle reaches a position close to that shown in Fig. 2, yoke 40 will be moved upwardly by engagement with the surface and in turn will move tube 48 against ball 52 to unseat the same. As this action occurs, sleeve 38 is always over slots 32 so as to prevent the escape of liquid at that point, should any of the liquid pass downwardly along the outer face of tube 48.

Manifestly this tube 48 may be altered as to specific form and a rod employed to lift ball 52 from seat 50. In any event, the liquid will pass downwardly to hollow chuck 26 and thence into grooves 24. These grooves are in direct communication with cavity 22 and no earth or foreign matter will be present when the liquid reaches the grooves or outlet ports to pass therefrom.

When the applicator is lifted, spring 44 will return yoke 40 and sleeve 38 to the normal inoperative position, and tube 48 will lower to allow ball 52 to seat. Spring 54 exerts its force against ball 52 to cause the same to follow the upper end of tube 48 and immediately thereafter be seated.

While pressure tank 10 has been shown to include a pump, it is obvious to those skilled in the art that a gravity feed may well be employed without departing from the spirit of the invention, and in fact, applicators having different appearances than that illustrated may be made without leaving the scope of the appended claims.

Having thus described the invention, what is claimed as new and desired to be secured by Letters Patent is:

1. An applicator of the character described comprising a staff; a reservoir carried thereby; a needle at one end of the staff; a conduit joining the reservoir and needle; a valve member and valve seat in the conduit; and means for unseating the valve member as the needle is forced into the ground a certain distance, said means including a tube mounted within the conduit for reciprocating movement, a yoke operably connected to the tube and projecting laterally from the conduit above the needle, and means for yieldably maintaining the tube and yoke at one end of their paths of travel.

2. An applicator of the character described comprising a staff; a reservoir carried thereby; a needle at one end of the staff; a conduit joining the reservoir and needle; a valve member and valve seat in the conduit; and means for unseating the valve member as the needle is forced into the ground a certain distance, said means including a tube mounted within the conduit for reciprocating movement, a yoke operably connected to the tube and projecting laterally from the conduit above the needle, and means for yieldably maintaining the tube and yoke at one end of their paths of travel, said valve member having a spring for moving the same against the valve seat when the tube is at said one end of its path of travel.

3. An applicator of the character described comprising a staff; a reservoir carried thereby; a needle at one end of the staff; a conduit joining the reservoir and needle; a valve member and valve seat in the conduit; and means for unseating the valve member as the needle is forced into the ground a certain distance, said means including a tube mounted within the conduit for reciprocating movement, a yoke operably connected to the tube and projecting laterally from the conduit above the needle, and means for yieldably maintaining the tube and yoke at one end of their paths of travel, said tube having one end thereof adapted to engage the valve member as the tube is moved toward the other end of its path of travel, said tube having openings in the wall thereof adjacent to its said one end to permit the flow of liquid thereinto as the valve member is held unseated.

4. An applicator of the character described comprising a staff; a reservoir carried thereby; a needle at one end of the staff; a conduit joining the reservoir and needle; a valve member and valve seat in the conduit; and means for unseating the valve member as the needle is forced into the ground a certain distance, said means including an elongated member mounted within the conduit for reciprocating movement, a cross pin on said member extending outwardly therefrom through a slot provided in the wall of said conduit, a sleeve slidably circumscribing the slotted portion of said conduit in connection with the cross pin, and a yoke rigid with and projecting laterally from the sleeve, said sleeve being long enough to cover the slot as the cross pin moves through its path of travel, said sleeve and yoke having a spring exerting force thereon to maintain the same at one end of their path of travel, said valve member having a spring in connection therewith for causing the valve member to follow the elongated member toward the valve seat as the last mentioned member and the yoke move toward one end of their paths of travel under the influence of the force exerted thereon by the said spring.

ROCHFORD R. NELSON.